United States Patent [19]

Chambers

[11] Patent Number: 5,576,387
[45] Date of Patent: Nov. 19, 1996

[54] PPE/POLYAMIDE COMPOSITIONS OF IMPROVED MELT STRENGTH

[75] Inventor: Gregory R. Chambers, Newburgh, Ind.

[73] Assignee: General Electric Company, Pittsfield, Mass.

[21] Appl. No.: 152,068

[22] Filed: Nov. 12, 1993

Related U.S. Application Data

[63] Continuation of Ser. No. 815,212, Dec. 31, 1991, abandoned.

[51] Int. Cl.[6] .................. C08L 71/12; C08L 77/00
[52] U.S. Cl. ............ 525/92 B; 525/92 D; 525/397; 528/340
[58] Field of Search .................. 525/92 B, 92 D, 525/397; 528/340

[56] References Cited

U.S. PATENT DOCUMENTS

| | | | |
|---|---|---|---|
| 3,687,904 | 8/1972 | Middleton | 528/340 |
| 4,338,421 | 7/1982 | Maruyama et al. | 525/905 |
| 4,600,741 | 7/1986 | Aycock et al. | 524/139 |
| 4,642,358 | 2/1987 | Aycock et al. | 549/245 |
| 4,654,405 | 3/1987 | Jalbert et al. | 525/391 |
| 4,659,763 | 4/1987 | Gallucci et al. | 524/358 |
| 4,732,938 | 3/1988 | Grant et al. | 525/92 |
| 4,743,651 | 5/1988 | Shibuya et al. | 525/92 |
| 4,900,786 | 2/1990 | Abolins et al. | 525/68 |
| 4,990,564 | 2/1991 | Taubitz et al. | 525/397 |
| 5,049,599 | 9/1991 | Steiert et al. | 524/606 |
| 5,071,924 | 12/1991 | Koch et al. | 525/66 |
| 5,073,596 | 12/1991 | Inoue et al. | 525/397 |
| 5,104,924 | 4/1992 | Goetz et al. | 524/508 |

*Primary Examiner*— Thomas Hamilton, III

[57] ABSTRACT

Thermoplastic compositions having improved melt strength comprise a polyphenylene ether polymer and a polyamide. The polyamide is formed from a diamine, a second amine selected from secondary triamines and polyamines, and a dicarbioxylic acid. The second amine is included in an amount sufficient to improve the melt strength of the composition. The compositions are particularly suitable for use in blow molding processes.

27 Claims, No Drawings

PPE/POLYAMIDE COMPOSITIONS OF IMPROVED MELT STRENGTH

This is a continuation of application Ser. No. 07/815,212 filed on Dec. 31, 1991, now abandoned.

FIELD OF THE INVENTION

The present invention relates to thermoplastic compositions comprising a polyphenylene ether polymer and a polyamide. More particularly, the present invention relates to such compositions which exhibit improved melt strength and which are advantageous for use in blow molding applications.

BACKGROUND OF THE INVENTION

Polyphenylene ether resins are well known in the art and exhibit a desirable combination of chemical, physical and electrical properties over a wide temperature range. This combination of properties renders polyphenylene ether resins suitable for use in a broad range of applications. Often times, polyphenylene ether resins are blended with other resins in order to improve their chemical resistance, their processability and/or other properties and to increase their fields of application.

Blends of polyphenylene ether polymers with polyamides are also well known in the art. Generally, polyamides possess a good combination of strength, toughness and resistance to solvents. Blends of polyphenylene ether polymers and polyamides have been provided which exhibit good solvent resistance and high temperature resistance. Owing to the numerous applications which require the use of thermoplastic compositions exhibiting such a desirable combination of properties, it is important that blend compositions of polyphenylene ether polymer and polyamide can be formed into shaped articles by use of blow molding processes, profile extrusion processes, sheet extrusion processes, and the like.

SUMMARY OF THE INVENTION

Accordingly, it is an object of the present invention to provide thermoplastic compositions comprising a polyphenylene ether polymer and a polyamide. It is a further object of the invention to provide such compositions which exhibit improved melt strength. It is a related object to provide thermoplastic compositions comprising a polyphenylene ether polymer and a polyamide, which compositions may be blow molded into shaped articles.

These and additional objects are provided by the thermoplastic compositions of the present invention which comprise a polyphenylene ether polymer and a polyamide. In accordance with an important feature of the invention, the polyamide is formed from a diamine, a second amine selected from secondary triamines and polyamines, and a dicarboxylic acid. The second amine is included in an amount sufficient to improve the melt strength of the compositions. The present Inventor has discovered that polyamides formed from a diamine, a second amine selected from secondary triamines and polyamines, and a dicarboxylic acid in accordance with the present invention may be blended with polyphenylene ether polymers to provide blends having improved melt strength and blow moldability.

These and additional objects and advantages will be more fully apparent in view of the following detailed description.

DETAILED DESCRIPTION

The present thermoplastic compositions comprise a polyphenylene ether polymer and a polyamide. The compositions exhibit improved melt strength as compared with conventional polyphenylene ether polymer-polyamide blend compositions which do not include the novel polyamide described herein. The compositions are particularly suitable for use in various processing methods requiring improved melt strength, for example, blow molding, profile extrusion and sheet extrusion. Within the context of the present invention, an improvement in melt strength is evidenced by an increase in the R* value which is defined as the ratio of the low shear rate viscosity at 1 sec$^{-1}$ of the composition to the high shear rate viscosity at 100 sec$^{-1}$, at a predetermined optimum processing temperature:

$$R^* = (\text{viscosity at 1 sec}^{-1})/(\text{viscosity at 100 sec}^{-1}).$$

Numerous experiments have shown that the optimum temperature for parison extrusion in a blow molding process is the temperature at which the shear viscosity of the material is 20,000 poise at 100 sec$^{-1}$. R* then becomes defined as R=(viscosity at 1 sec$^{-1}$/20,000 poise), where the low shear viscosity is measured at the optimum melt temperature. For more details concerning the R* value, see the Abolins et al U.S. Pat. No. 4,900,786 and T. P. Dunton et al, Polymer Systems Technology, Memo Report PST 83-6.

Polyphenylene ether polymers are well known in the art and are generally of the formula

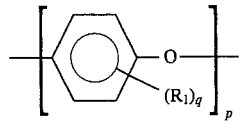

wherein each $R_1$ is individually selected from the group consisting of halogen, alkyl, aryl and alkoxy, q is from 0 to 4 and p is at least 20. When $R_1$ comprises an alkyl group, an aryl group or an alkoxy group, the group suitably contains from 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875, in the Stamatoff U.S. Pat. Nos. 3,257,357 and 3,257,358, and in U.S. Pat. No. 4,935,472 of S. B. Brown et al, all of which are incorporated herein by reference. Throughout the specification and claims the term "polyphenylene ether resin" includes unsubstituted polyphenylene ether polymers, substituted polyphenylene ether polymers, polyphenylene ether copolymer and blends thereof.

Preferred polyphenylene ether polymers adapted for use in the present invention include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-propyl-1,4phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene) ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene) ether; poly(2,6-dibromo-1,4-phenylene)ether; poly(3-bromo-2,6-dimethyl-1,4-phenylene)ether, copolymers thereof and mixtures thereof, and the like. Particularly preferred polyphenylene ether polymers for use in the compositions of the present invention include poly(2,6-dimethyl-1,4-phenylene) ether, poly(2,3,6-trimethyl-1,4-phenylene)ether, blends of these polymers, and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

The polyamide which is included in the thermoplastic blend compositions of the present invention is formed from a diamine, a second amine selected from secondary triamines and polyamines, and a dicarboxylic acid. The second amine is included in an amount sufficient to improve the melt strength of the composition, and preferably the polyamide is formed from less than about 5 weight percent of the second amine, based on the diamine and the second amine. In a further preferred embodiment, the polyamide is formed from less than about one weight percent of the second amine, based on the diamine and the second amine. Although the present invention is not limited to this theory, it is believed that the second amine provides branching within the polyamide and that the branching alters the viscosity and rheological properties of the polyphenylene ether polymer-polyamide blend compositions.

The process for the preparation of the polyamide comprises polymerizing substantially equal molar proportions of a diamine containing at least two carbon atoms between the amino groups and a dicarboxylic acid in accordance with techniques well known in the art, as set forth, for example, in the *Encyclopedia of Polymer Science and Technology*, Vol. 10, John Wiley & Sons, Inc. (1969), pages 487–488. In the preparation of the polyamides according to the present invention, the substantially equal molar amount of the diamine includes the minor portion of the secondary triamine or polyamine as indicated above. The term "substantially equal molar" used in describing the proportions of the diamine and the dicarboxylic acid includes both strict equal molar proportions and slight departures therefrom as known in the art.

Diamines suitable for use in the preparation of the polyamide include the alkyl, aryl and alkyl-aryl diamines. Such diamines include, for example, those represented by the general formula:

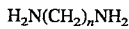

$$H_2N(CH_2)_nNH_2$$

wherein n is an integer of from 2 to 16. Specific examples of such diamines include trimethylenediamine, tetramethylenediamine, pentamethylenediamine, octamethylenediamine, hexamethylenediamine, trimethyl hexamethylenediamine, meta-phenylene diamine, meta-xylene diamine and the like. Hexamethylenediamine is a preferred diamine for use in preparing the polyamide of the present invention.

The dicarboxylic acids suitable for use in preparing the polyamide may be aromatic, for example, isophthalic and terephthalic acids, or aliphatic. The aliphatic dicarboxylic acids may be of the formula

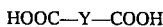

HOOC—Y—COOH wherein Y represents a divalent aliphatic group containing at least 2 carbon atoms. Examples of such acids include sebacic acid, octadecanedoic acid, suberic acid, glutaric acid, pimelic acid and adipic acid. A preferred dicarboxylic acid comprises adipic acid.

Typical examples of the polyamides include, for example, polyhexamethylene adipamide (nylon 6,6); polyhexamethylene azelaiamide (nylon 6,9); polyhexamethylene sebacamide (nylon 6,10); polyhexamethylene isophthalamide (nylon 6, I); polyhexamethylene terephthalamide (nylon 6,T); polyamide of hexamethylene diamine and n-dodecanedioic acid (nylon 6,12); the polyamide resulting from hexamethylenediamine and a mixture of isophthalic and terephthalic acids (nylon 6,I/T); polyamides resulting from terephthalic acid and/or isophthalic acid and trimethyl hexamethylene diamine; polyamides resulting from adipic acid and meta xylylenediamines; polyamides resulting from adipic acid, azelaic acid and 2,2-bis-(p-aminocyclohexyl)propane; and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following: hexamethylene adipamide/caprolactam (nylon 6,6/6); hexamethylene adipamide/hexamethylene-isophthalamide (nylon 6,6/6,I); hexamethylene adipamide/hexamethylene- terephthalamide (nylon 6,6/6T); hexamethylene adipamide/hexamethylene-azelaiamide (nylon 6,6/6,9); and hexamethylene adipamide/hexamethylene azelaiamide/caprolactam (nylon 6,6/6,9/6).

particularly preferred polyamide for use in the present compositions is formed from hexamethylene diamine, the second amine and adipic acid.

The second amine which is used in forming the polyamide included in the present compositions is a secondary triamine or polyamine and may comprise an alkyl secondary triamine or polyamine, an aryl secondary triamine or polyamine or an alkyl-aryl secondary triamine or polyamine. A preferred second amine for use in forming the present polyamide comprises bis-hexamethylene triamine.

The relative proportions of the polyphenylene ether polymer and the polyamide included in the thermoplastic compositions of the present invention will vary depending on the desired use or application of the composition. Preferably, the compositions comprise from about 5 to about 95 weight percent polyphenylene ether polymer and from about 5 to about 95 weight percent polyamide. More preferably, the compositions comprise from about 25 to about 75 weight percent polyphenylene ether polymer and from about 25 to about 75 weight percent polyamide.

The compositions may be prepared using conventional techniques such as melt mixing, coextrusion or the like. In a preferred embodiment, the polyphenylene ether polymer and the polyamide are melt extruded and formed into pellets. The pellets are then remelted and the resulting melt is extruded through a ring dye to form a parison in accordance with techniques well known in the blow molding art. In accordance with further techniques well known in the art, the parison is then positioned within a mold and a gas stream is blown into the parison positioned within the mold to form a shaped article. Owing to the improved melt strength of the present compositions, these compositions are particularly suitable for use in such blow molding processes.

The compositions of the present invention may further contain additional components and/or conventional additives known in the art. For example, the compositions may include one or more additional polymer components, for example, an impact modifier or the like, and/or conventional additives including, but not limited to, thermal, oxidative and/or color stabilizers, fillers, reinforcing agents, flame retardants, processing agents and the like.

In a preferred embodiment, the thermoplastic compositions further include an impact modifier. Various impact modifiers are well known in the art, and particularly for use in blends of polyphenylene ether and polyamide as set forth, for example, in the Aycock et al U.S. Pat. Nos. 4,600,741 and 4,642,358, the Jalbert et al U.S. Pat. No. 4,654,405, the Grant et al U.S. Pat. No. 4,732,938 and the Gallucci et al U.S. Pat. No. 4,659,763, all of which are incorporated herein by reference. The amount of impact modifier included in the compositions will depend on the specific type of impact modifier employed and the intended use of the composition. In a preferred embodiment, the impact modifier is included in an amount of from about 1 to about 30 weight percent, based on the polyphenylene ether polymer, the polyamide and the impact modifier.

In a further embodiment, the impact modifier comprises a block copolymer of a vinyl aromatic monomer and an alkene hydrocarbon monomer or a conjugated diene monomer. Various types of such block copolymers are known in the art. For example, the block copolymer may comprise a tapered linear block copolymer and generally comprises blocks of A and B, wherein A is a polymerized vinyl aromatic hydrocarbon block and B is a hydrogenated, partially hydrogenated, or non-hydrogenated block derived from at least one polymerized conjugated diene. Tapered linear block copolymers are known in the art, as are their methods of preparation, and are taught, for example, in U.S. Pat. Nos. 4,948,832, 4,939,207, 4,918,145, 4,914,248, 4,913,971 and 4,116,917, all of which are incorporated herein by reference. Tapered triblock polymers are available commercially under the tradename Finaclear® 520 from Fina Oil Company.

In one embodiment, the block copolymers may be represented by the formula A-B-A wherein the terminal blocks A, which may be the same or different, are thermoplastic homopolymers or copolymers prepared from a vinyl aromatic compound. Examples of the vinyl aromatic compound include, but are not limited to, styrene, alpha-methylstyrene, vinyl toluene, vinyl xylene, ethylvinyl xylene, vinyl naphthalene and the like, or mixtures thereof. The center block B comprises an elastomeric polymer derived from alkene hydrocarbons such as ethylene or butylene, conjugated dienes or the like, or mixtures thereof. The block copolymers may be subjected to a hydrogenation process whereby the unsaturated rubber block portion B of the copolymer is hydrogenated. Hydrogenation may be accomplished using conventional hydrogenation catalysts and reaction conditions. In the hydrogenated block copolymers, the terminal blocks A may have an average molecular weight of from about 4,000 to about 115,000 while the center blocks B have an average molecular weight of from about 20,000 to about 450,000. Hydrogenated block copolymers are specifically described in the Jones U.S. Pat. No. 3,431,323 and the DeLaMare et al U.S. Pat. No. 3,670,054, both of which are incorporated herein by reference. Suitable block copolymers for use in the present invention comprise hydrogenated styrene-butadiene-styrene (styrene-ethylene-butylene-styrene) block copolymers and hydrogenated styrene-isoprene-styrene block copolymers. Block copolymers of this type are commercially available under the tradenames Kraton® from Shell Chemical and Septon® from Kuraray Co., Ltd.

In another embodiment, the vinyl aromatic polymer comprises a radial block copolymer of a vinyl aromatic monomer and a conjugated diene monomer. These radial block copolymers are also well known in the art. Copolymers of this type generally comprise from about 60 to about 95 percent by weight polymerized vinyl aromatic monomer and about 40 to about 5 percent by weight polymerized conjugated diene monomer. The copolymer has at least three polymer chains which form a radial configuration, and each chain usually terminates with the substantially non-elastomeric segment, to which an elastomeric polymer segment is joined. These block copolymers are also referred to "polymodal branched block copolymers" and "star polymers." Examples of radial block copolymers are set forth in the Kitchen et al U.S. Pat. No. 3,639,517 which is incorporated herein by reference. These block copolymers are commercially available under the tradename K-Resin® from Phillips Petroleum.

Alternatively, the radial block copolymer of a vinyl aromatic monomer in a conjugated monomer may comprise a radial teleblock copolymer which contains segments or blocks which themselves comprise a conjugated diene polymer, vinyl aromatic polymer blocks, and a coupling agent. These block copolymers are sometimes referred to as "branched" polymers and are set forth in U.S. Pat. No. 4,097,55, which is incorporated herein by reference. The radial teleblock copolymers are prepared by methods known in the art, for example, as disclosed in the Zelinski et al U.S. Pat. No. 3,281,383, incorporated herein by reference. These polymers are also available commercially, for example, as the Finaprene® products, grades 401, 411, 414, 416 and 417, from Fina Oil Company.

The compositions of the present invention and methods related thereto are demonstrated by the following examples. In the examples and throughout the present specification, reference to parts and percentages are by weight unless otherwise specified.

EXAMPLE 1

In this example, compositions were prepared comprising 49 parts by weight of a polyphenylene ether polymer, 41 parts by weight of a polyamide and 10 parts by weight of a block copolymer impact modifier supplied commercially under the tradename Kraton® D 1102 by Shell Chemical. The compositions also contained about 1 part by weight of a stabilizer package. In Composition A, the polyamide was a conventional Nylon 6,6 formed from hexamethylenediamine and adipic acid. In Composition B according to the present invention, the polyamide was formed from hexamethylenediamine, a minor amount of bis-hexmethylene triamine (BHMT) and adipic acid. Specifically, the polyamide of Composition B contained 10 milliequivalents/kg of the bis-hexamethylene triamine. The compositions were prepared using conventional melt extrusion techniques. Samples of the resulting compositions were subjected to measurement of their melt viscosity according to ASTM-D-3835-79 at 282° C. and 1500/sec and to measurement of the R* value according to the procedures described previously. The results of these measurements are set forth in Table I.

TABLE I

| Composition | BHMT (meg/kg) | Melt Viscosity (poise) | R* |
| --- | --- | --- | --- |
| A | 0 | 2011 | 7.2 |
| B | 10 | 2628 | 12.4 |

The results set forth in Table I demonstrate that Composition B according to the present invention exhibited an increased melt viscosity and R* value. The increases in melt viscosity and the R* value indicate that Composition B will exhibit improved melt strength for profile extrusion and improved blow moldability.

EXAMPLE 2

A fifty pound sample of each of Compositions A and B as described in Example 1 was prepared and evaluated in a blow molding apparatus. The sample of Composition A blow molded poorly due to poor melt strength. The resulting parison had numerous holes and could not be "blown." In contrast, the sample of Composition B easily formed the parison and blow molded easily to form shaped articles.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A thermoplastic composition comprising a polyphenylene ether polymer and a polyamide, said polyamide being formed from a diamine, a second amine, and a dicarboxylic acid, said second amine being a polyamine, said second amine being included in an amount sufficient to improve the melt strength of the composition.

2. A thermoplastic composition as defined by claim 1, wherein the polyamide is formed from less than about 5 weight percent of the second amine, based on the diamine and the second amine.

3. A thermoplastic composition as defined by claim 1, wherein the polyamide is formed from less than about 1 weight percent of the second amine, based on the diamine and the second amine.

4. A thermoplastic composition as defined claim 1, wherein the diamine is selected from the group consisting of trimethylenediamine, tetramethylenediamine, pentamethylenediamine, octamethylenediamine, hexamethylenediamine, trimethyl hexamethylenediamine, meta-phenylenediamine, and meta-xylenediamine.

5. A thermoplastic composition as defined by claim 4, wherein the diamine comprises hexamethylene diamine.

6. A thermoplastic composition as defined by claim 1, wherein the dicarboxylic acid is selected from the group consisting of sebacic acid, octadecanedoic acid, suberic acid, glutaric acid, pimelic acid, adipic acid, isophthalic acid, and terephthalic acid.

7. A thermoplastic composition as defined by claim 6, wherein the dicarboxylic acid comprises adipic acid.

8. A thermoplastic composition as defined by claim 1, wherein the polyamide is formed from hexamethylene diamine, the second amine and adipic acid.

9. A thermoplastic composition as defined by claim 1, wherein the second amine is an alkyl secondary triamine.

10. A thermoplastic composition as defined by claim 1, wherein the second amine is an aryl secondary triamine.

11. A thermoplastic composition as defined by claim 1, wherein the second amine is a secondary triamine.

12. A thermoplastic composition as defined by claim 1, wherein the second amine comprises bis-hexamethylene triamine.

13. A thermoplastic composition as defined by claim 1, comprising from about 5 to about 95 weight percent polyphenylene ether polymer and from about 5 to about 95 weight percent polyamide.

14. A thermoplastic composition as defined by claim 1, comprising from about 25 to about 75 weight percent polyphenylene ether polymer and from about 25 to about 75 weight percent polyamide.

15. A thermoplastic composition as defined by claim 1, wherein the polyphenylene ether polymer comprises poly(2,6-dimethyl-1,4-phenylene)ether.

16. A thermoplastic composition as defined by claim 1, wherein the polyphenylene ether polymer comprises poly(2,3,6-trimethyl-1,4-phenylene) ether.

17. A thermoplastic composition as defined by claim 1, wherein the polyphenylene ether polymer comprises a copolymer of or a blend of polymers of 2,6-dimethyl-1,4phenylene ether and 2,3,6-trimethyl-1,4-phenylene ether.

18. A thermoplastic composition as defined by claim 1, further comprising an impact modifier.

19. A thermoplastic composition as defined by claim 18, wherein the impact modifier comprises a block copolymer of a vinyl aromatic monomer and a conjugated diene monomer.

20. A thermoplastic composition as defined by claim 19, wherein the impact modifier comprises a styrene-butadiene-styrene block copolymer.

21. A thermoplastic composition as defined by claim 20, wherein the block copolymer is hydrogenated.

22. A thermoplastic composition as defined by claim 18, wherein the impact modifier is included in an amount of from about 1 to about 30 weight percent.

23. A blow molded product formed from the thermoplastic composition of claim 1.

24. A method for blow molding a shaped article, comprising the steps of melt extruding a blend of a polyphenylene ether polymer and a polyamide formed from a diamine, a second amine, and a dicarboxylic acid, said second amine being a polyamine, said second amine being included in an amount sufficient to improve the melt strength of the composition; forming pellets from the melt extrudate; remelting the pellets; extruding the resulting melt through a ring die to form a parison; positioning the parison within a mold; and blowing a gas stream into the parison position within the mold to form a shaped article.

25. A method for improving the melt strength of a thermoplastic composition of polyphenylene ether polymer and a polyamide, comprising blending a polyphenylene ether polymer and a polyamide formed from a diamine, a second amine, and a dicarboxylic acid, said second amine being a polyamine, said second amine being included in amount sufficient to improve the melt strength of the thermoplastic composition.

26. A thermoplastic blow molding composition consisting essentially of:
   (a) a polyphenylene ether resin;
   (b) a polyamide resin formed from a diamine, a second amine, wherein said second amine comprises a polyamine and a dicarboxylic acid, said polyamine being included in amount sufficient to improve the melt strength of the composition.

27. The composition of claim 26 wherein said polyamine is present at a level of from between 1 percent by weight and 5 percent by weight based on the combined weight of said diamine and said polyamine.

* * * * *